Patented July 14, 1936

2,047,515

UNITED STATES PATENT OFFICE 2,047,515

AZODYESTUFFS INSOLUBLE IN WATER AND FIBER DYED THEREWITH

Leopold Laska and Arthur Zitscher, Offenbach-on-the-Main, Germany, assignors to General Aniline Works, Inc., New York, N. Y., a corporation of Delaware No Drawing. Application August 27, 1931, Serial No. 559,812. In Germany September 1, 1930

9 Claims. (Cl. 260—72)

Our present invention relates to new azodyestuffs insoluble in water and to fiber dyed therewith.

These dyestuffs contain as typical component twice the arylamide of the following formula:

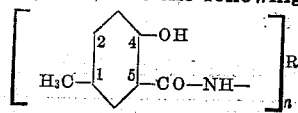

wherein $n$ means the number 1 or 2 and R a benzene or naphthalene nucleus which may be substituted by alkyl, alkoxy, halogen or nitro groups. In the molecule of our new dyestuffs twice the aforesaid arylamide is attached by means of azo groups to one radical of the group consisting of diphenyl, azobenzene, phenyl-azo-naphthalene, phenylamino-phenyl-azobenzene which radicals may contain alkyl, alkoxy, halogen, nitro groups or an acylamino-group.

In consequence of the fact that the 1-methyl-4-hydroxy-benzene-radical of the above formula may be once or twice attached to the radical R by means of CO—NH-groups (which groups are named throughout this specification "carbonyl-amino") and that it is twice attached by means of azo groups to the radical of the aforesaid group, a general formula covering all the dyestuffs forming the subject of our present invention cannot be given.

The dyestuffs are prepared by combining the tetrazo compound of the group consisting of diphenyl, azobenzine, phenyl-azo-naphthalene, phenylamino-phenyl-azobenzene which may contain alkyl, alkoxy, halogen, nitro groups or an acylamino-group as substituents, with an arylamide of the above formula.

The dyestuffs may be advantageously produced on acetate silk according to the developing method.

In this manner yellow to brown dyeings are obtained which could hitherto not be produced in alike beauty and multiplicity of shades. These dyeings are distinguished by a good fastness, especially to cross-dyeing.

In order to further illustrate our invention, the following examples are given. We wish it, however, to be understood that we are not limited to the particular products or reaction conditions mentioned therein.

Example 1

Acetate silk is impregnated at 60–70° C. in a solution, containing per liter 1 gr. of 4,4′-diamino-3,3′-dimethoxy-diphenyl, 2 cc. of hydrochloric acid of 20° Bé. and 5 grs. of sodium acetate. Then the goods are tetrazotized in the usual manner and developed in a solution containing per liter 2 grs. of 1-(4-hydroxy-1-methyl-benzene-3-carbonyl)-amino-2-methyl-benzene, 4 cc. of caustic soda solution of 34° Bé. and 2 cc. of Turkey red oil. After rinsing and soaping a yellowish brown dyeing of a very good fastness to cross-dyeing is obtained.

The dyestuff thus produced on the fiber corresponds to the formula:

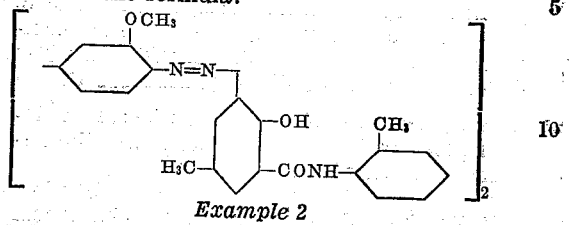

Example 2

When 1-(4-hydroxy-1-methyl-benzene-3-carbonyl)-amino-2-methyl-benzene is replaced by (4-hydroxy-1-methyl-benzene-3-carbonyl)-amino-benzene, a dark reddish brown dyeing of a similar fastness is obtained.

Example 3

Acetate silk is impregnated in a bath containing per liter 0.5 gr. of 4,4′-diamino-2-methoxy-2′,5′-dimethyl-azobenzene, 2 cc. of hydrochloric acid of 20° Bé. and 5 grs. of sodium acetate. Then it is tetrazotized on the fiber and developed in a solution containing per liter 2 grs. of 1-(4-hydroxy-1-methyl-benzene-3-carbonyl)-amino-2-methyl-4-methoxy-benzene, 4 cc. of caustic soda solution of 34° Bé. and 2 cc. of Turkey red oil. After finishing in the usual way a yelowish orange-brown dyeing of a very good fastness is obtained. The dyestuff thus produced on the fiber corresponds to the formula:

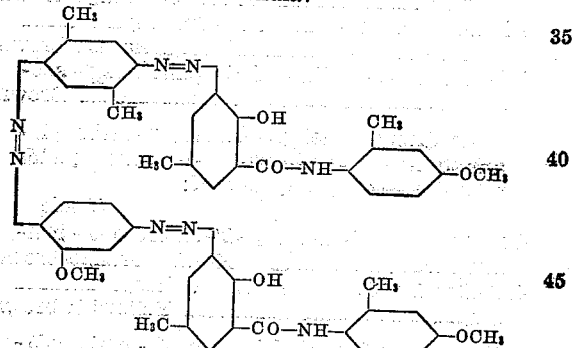

The same tetrazo compound yields with (4-hydroxy-1-methyl-benzene - 3 - carbonyl) - amino-benzene a neutral brown dyeing.

Example 4

Acetate silk is impregnated in a bath containing per liter 1 gr. of 4,4′-diamino-2,2′-dichloro-diphenyl, 2 cc. of hydrochloric acid of 20° Bé. and 5 grs. of sodium acetate. The goods are tetrazotized and developed in a bath containing per liter 2 grs. of 1,4-di-(4-hydroxy-1-methyl-benzene-3-carbonyl-amino)-2,5-dimethoxy-benzene, 4 cc. of caustic soda solution of 34° Bé. and 2 cc.

of Turkey red oil. After finishing in the usual manner a full yellow dyeing of a very good fastness is obtained.

4,4'-diamino-2-methyl-5-methoxy- azobenzene yields with the same combining component an orange brown dyeing.

With other diamino compounds of the above mentioned kind and with other arylamides of 4-hydroxy-1-methyl-benzene-3-carboxylic acid the process may be likewise carried out.

The following table shows for example the shades of some dyestuffs of this kind:

(4-hydroxy-1-methylbenzene-3-carbonyl) - aminobenzene yields with the tetrazo-compound of:

| | Shade |
|---|---|
| 4-amino-1-(4' - amino-phenyl-azo) - naphthalene | Reddish brown |
| 4-amino-1-(4'-amino-2'-methyl-5' - methoxy-phenyl-azo) -naphthalene | Brown |
| 4,4'-diamino-5 - methoxy - 2 - chloro-azo-benzene | Yellowish brown |
| 4,4'-diamino-2-nitro-diphenyl | Old gold |

1-(4-hydroxy-1-methyl-benzene-3- carbonyl) - amino-2-methyl-benzene yields with the tetrazo-compound of:

| | Shade |
|---|---|
| 4,4'-diamino-2,5,2'-trimethoxy-azo- benzene | Full reddish brown |
| 4,4'-diamino-3,3'-dimethoxy-diphenyl | Yellowish brown |
| 4,4'-diamino-2,2'-dichloro-diphenyl | Yellow |
| 4 - amino - 4' - (4''-amino-phenyl-amino) - 2 - methyl-5-methoxy-azo-benzene | Neutral brown |
| 4,4'-diamino-2-methyl-5-methoxy - 2' - chloro-azo-benzene | Yellowish brown |
| 4-amino-3-ethoxy-1- (4' - amino-phenyl-azo) - naphthalene | Yellowish brown |
| 4,4'-diamino-2- acetyl-amino - 5 - methyl - 2' - chloro-azo -benzene | Reddish brown |

1- (4-hydroxy-1-methyl-benzene-3-carbonyl) - amino-2-methoxy-benzene yields with the tetrazocompound of:

| | Shade |
|---|---|
| 4,4'-diamino-2,5- dimethyl - 2' - methoxy-azo-benzene | Yellowish orange-brown |
| 4,4'-diamino-3,3'-dimethoxy-diphenyl | Yellowish brown |
| 4,4'-diamino-2-methyl - 5,2' - dimethoxy - azo-benzene | Brown |

1.(4 - hydroxy-1-methyl-benzene-3-carbonyl) - amino-2-methyl-4-methoxy-benzene yields with the tetrazocompound of:

| | Shade |
|---|---|
| 4,4'-diamino-2,5-dimethyl-2'-chloro-azo - benzene | Yellowish orange-brown |
| 4,4'-diamino-3,3'-dimethoxy-diphenyl | Yellowish brown |

1-(4-hydroxy-1-methyl-benzene-3 - carbonyl) - amino-2-methoxy-4 - chloro - benzene yields with the tetrazocompound of:

| | Shade |
|---|---|
| 4,4'-diamino-3,3'-dichloro-diphenyl | Yellowish brown |
| 4,4'-diamino-3,3'-dimethoxy-diphenyl | Yellowish brown |
| 4,4'-diamino-2,5-dimethyl - 3' - methoxy - azo-benzene | Yellowish brown |
| 4,4'-diamino-2-methyl- 5,2' - dimethoxy - azo-benzene | Reddish brown |
| 4,4'-diamino-2,5-dimethoxy - 2' - chloro - azo-benzene | Reddish brown |

1-(4-hydroxy-1-methyl-benzene-3 - carbonyl) -amino-3-nitro-benzene yields with the tetrazocompound of:

| | Shade |
|---|---|
| 4,4'-diamino-3,3'-dimethoxy-diphenyl | Olive brown |
| 4,4'-diamino-2-methyl-5- methoxy - azo - benzene | Full brown |

1-(4-hydroxy-1-methyl-benzene-3- carbonyl) - amino-naphthalene yields with the tetrazocompound of:

| | Shade |
|---|---|
| 4,4'-diamino-3,3'-dimethoxy-diphenyl | Neutral brown |
| 4,4'-diamino-3,3'-dichloro-diphenyl | Yellowish orange-brown |

2-(4-hydroxy-1-methyl-benzene-3- carbonyl) - amino-naphthalene yields with the tetrazo-compound of:

| | Shade |
|---|---|
| 4,4'-diamino-2-methyl-5- methoxy - azo - benzene | Dark brown |
| 4,4'-diamino-2,5-dimethyl-2'-chloro-azo - benzene | Brown |
| 4,4'-diamino-2,5,2'-trimethoxy-azo - benzene | Blackish brown |

4,4'-di-(4-hydroxy-1-methyl-benzene - 3 - carbonyl - amino) - 3,3' - dimethoxy - diphenyl yields with the tetrazocompound of:

| | Shade |
|---|---|
| 4,4'-diamino-3,3'-dimethoxy-diphenyl | Yellowish orange-brown |
| 4,4'-diamino-2,5,2'-trimethoxy-azo - benzene | Full reddish brown |

1,4-di(4-hydroxy-1-methyl-benzene-3-carbonyl-amino)-2- methyl - 5 - methoxy - benzene yields with the tetrazocompound of:

| | Shade |
|---|---|
| 4,4'-diamino-3,3'-dimethoxy-diphenyl | Yellowish brown |
| 4,4'-diamino-2-methyl- 5,2' - dimethoxy - azo-benzene | Brown |
| 4,4'-diamino-2-methyl-5-methoxy- 2' - chloro-azo-benzene | Orange brown |
| 4,4'-diamino-2',5'-dimethyl - 3 - methoxy-azo-benzene | Orange brown |
| 4,4'-diamino-2,2'-dichloro-diphenyl | Yellow |
| 4-amino-4'- (4''- amino - phenyl - amino) - 2 - methyl-5-methoxy-azo-benzene | Brown |

We claim:

1. As new compounds the azodyestuffs obtained by combining a tetrazo-compound of a radical of the group consisting of diphenyl, azobenzene, phenyl-azo-naphthalene, phenylamino-phenyl-azobenzene which radicals may contain alkyl, alkoxy, halogen, nitro-groups or an acylamino-group with an arylamide of the formula:

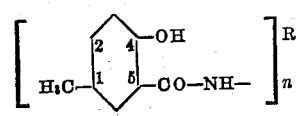

wherein $n$ means the number 1 or 2 and R a benzene or naphthalene nucleus which may be substituted by alkyl, alkoxy, halogen or nitro-groups, which compounds are insoluble in water and yield when produced on acetate silk yellow to brown dyeings of a good fastness to cross-dyeing.

2. As new compounds the azodyestuffs of the general formula:

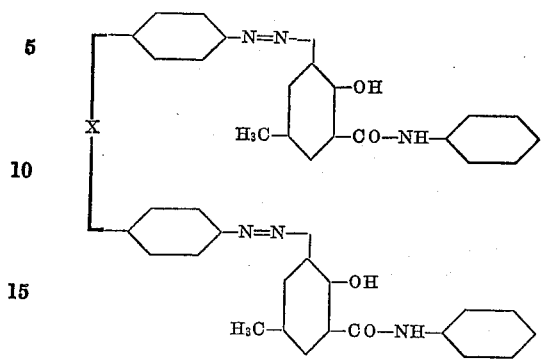

wherein the benzene nuclei not containing the hydroxy groups may contain alkyl, alkoxy, halogen or nitro-groups and X means a C—C-bond or an azo-group, which compounds are insoluble in water and yield when produced on acetate silk yellow to brown dyeings of a good fastness to cross-dyeing.

3. As a new compound the azodyestuff of the formula:

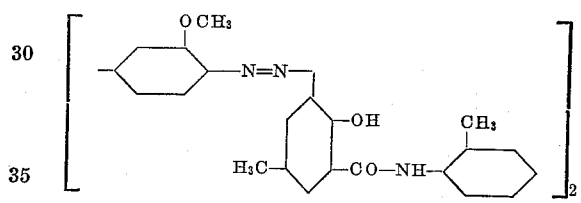

which compound is insoluble in water and yields when produced on acetate silk yellowish brown dyeings of a good fastness to cross-dyeing.

4. As a new compound the azodyestuff of the formula:

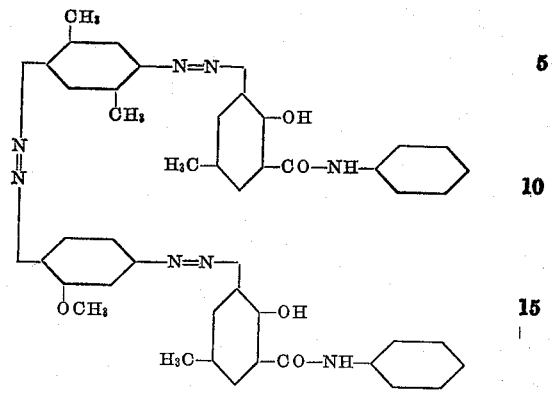

which compound is insoluble in water and yields when produced on acetate silk neutral brown dyeings of a good fastness to cross-dyeing.

5. The azodyestuffs obtained by combining a diazotized aromatic amino compound and an arylide made by condensing a hydroxy-carboxylic acid of the benzene series which is substituted by a methyl group in the para-position to the OH group, with primary aromatic amines of the benzene, naphthalene and diphenyl series.

6. Fiber dyed with the azodyestuffs as claimed in claim 1.

7. Fiber dyed with the azodyestuffs as claimed in claim 2.

8. Fiber dyed with the azodyestuff as claimed in claim 3.

9. Fiber dyed with the azodyestuff as claimed in claim 4.

LEOPOLD LASKA.
ARTHUR ZITSCHER.